United States Patent [19]

Kraft et al.

[11] Patent Number: 4,854,633

[45] Date of Patent: Aug. 8, 1989

[54] ROOF BOW LOCKING SYSTEM

[75] Inventors: Kenneth N. Kraft; Daniel Powers, both of Evansville, Ind.

[73] Assignee: George Koch Sons, Inc., Evansville, Ind.

[21] Appl. No.: 178,187

[22] Filed: Apr. 6, 1988

[51] Int. Cl.[4] .............................................. B60J 7/00
[52] U.S. Cl. ................................... 296/104; 296/100; 105/377
[58] Field of Search ................... 296/104, 100, 118; 292/259, 48, 53, 196; 105/377

[56] References Cited

U.S. PATENT DOCUMENTS

| | | | |
|---|---|---|---|
| 1,799,288 | 4/1931 | Davis | 292/48 X |
| 2,886,375 | 5/1959 | Crawford . | |
| 2,893,329 | 7/1959 | Janeczko | 105/377 |
| 2,955,874 | 10/1960 | Brindley | 296/104 |
| 2,974,999 | 3/1961 | Stuart . | |
| 3,126,224 | 3/1964 | Carter, Jr. et al. . | |
| 3,205,002 | 9/1965 | Seng | 296/100 |
| 3,226,153 | 12/1965 | Haid | 296/10 X |
| 3,252,730 | 5/1966 | Chieger et al. . | |
| 3,544,156 | 12/1970 | Rusten | 296/100 |
| 3,894,766 | 7/1975 | Woodward | 105/377 X |
| 4,265,479 | 5/1981 | Langston | 296/100 |
| 4,302,044 | 11/1981 | Sims | 296/100 X |
| 4,335,915 | 6/1982 | Knapp | 296/100 X |
| 4,762,345 | 8/1988 | Stluka et al. | 296/48 X |

Primary Examiner—Johnny D. Cherry
Assistant Examiner—Brian Sells
Attorney, Agent, or Firm—Barnes & Thornburg

[57] ABSTRACT

A locking arrangement for securing roof bow members of a trailer unit wherein several bow members are mounted at one side wall of the trailer for vertical pivoting and are simultaneously latched at an opposing side wall to prevent vertical movement thereof. The latching mechanism consists of a plurality of locking bar levers which are each pivoted on the opposing side wall to have one end overlie a retaining ring on one end of the bow members. A common actuator rests on top of the opposing wall and is pivotally attached to each of the locking bar levers at their non-overlying end. A shaft is connected by a pivot arm to the actuator and extends vertically downward adjacent the floor of the trailer where it is attached to a pivot handle to cause the locking bar levers to be positioned in either an overlying or non-overlying position with respect to their individual retaining rings.

11 Claims, 1 Drawing Sheet

U.S. Patent  Aug. 8, 1989  4,854,633
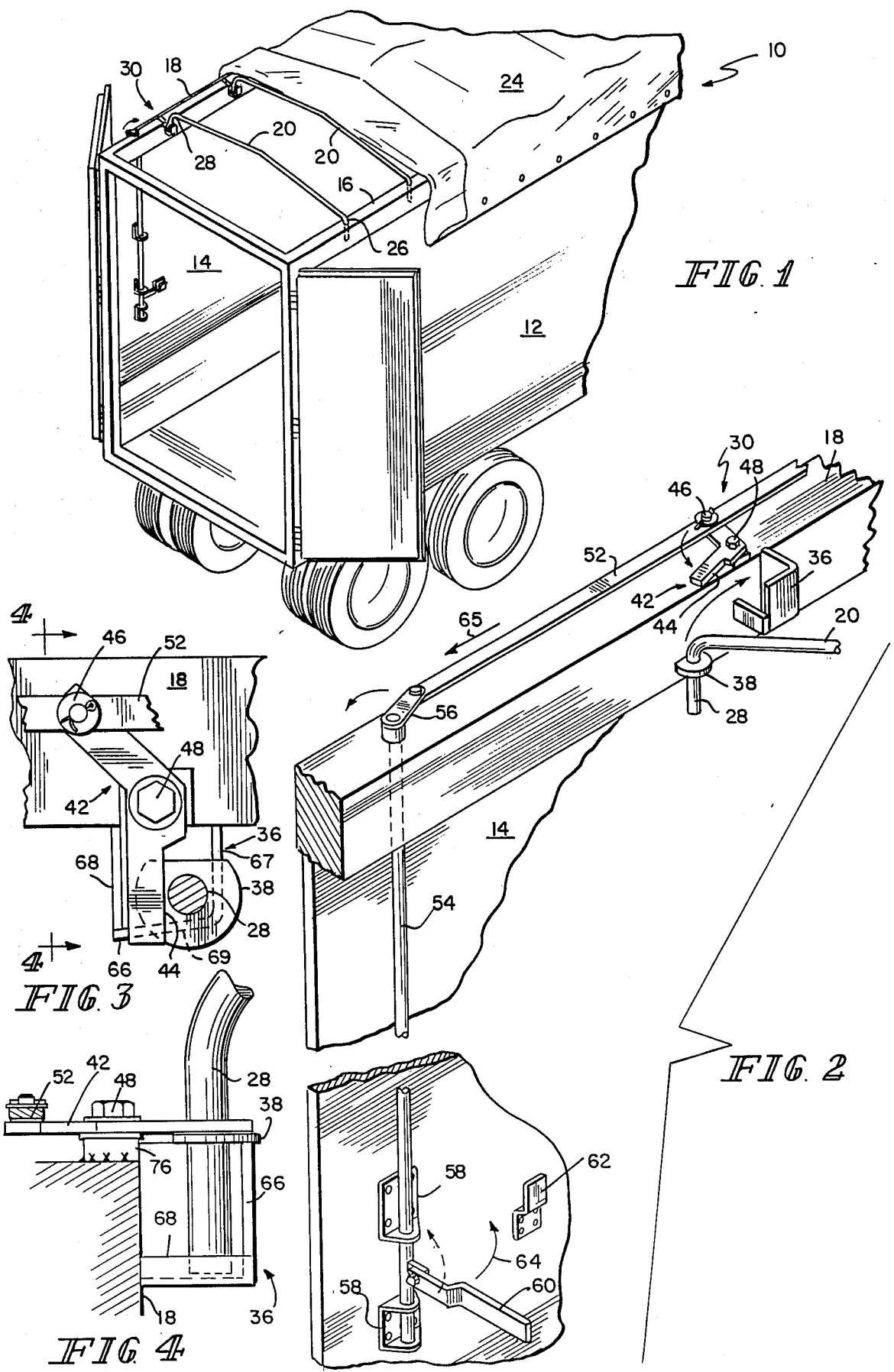

ROOF BOW LOCKING SYSTEM

BACKGROUND AND SUMMARY OF THE INVENTION

The present invention relates to a roof bow system for a trailer unit. More particularly, the present invention relates to a roof bow system in which one end of each individual roof bow is held in a support member and is locked in the support member by individual locking devices, with all of the locking devices actuated by a common actuation device.

Conventional roof bow systems for open-top trailer units are known. Such roof bow systems are used on open trailer units of conventional tractor-trailer assemblies to support a flexible cover which is normally placed over the top of the trailer unit. Such conventional roof bow systems include a plurality of individual roof bow members which are generally bars which extend laterally across the top of the trailer unit from side to the other. Each roof bow member includes a downwardly turned end which is sized and oriented to engage a recess formed in the top rail of each side of the trailer unit. Each roof bow member may be angled somewhat near its center such that, when installed, the roof bow member has somewhat domed shape.

The recesses formed in the top rails of the sides of the trailer are normally simply downwardly extending holes in that top rail. The recesses are sized such that the corresponding end of the roof bow member exactly fits within the recess with little or not play permitted. This provides for a tight fit of the roof bow ends in the recesses which is necessary so that the roof bow members are not subject to excess movement or vibration when the trailer is moving.

One problem with conventional roof bow systems utilizing the above-described tight fit of the roof bow members in the individual recesses is that, because of the tight fit, the roof bow members are difficult to remove from the recesses when desired. It will be understood that it is necessary to remove the roof bows when unlimited access to the trailer unit is necessary. For example, whenever it is necessary to drive a conventional forklift into the trailer unit to either load or unload the trailer, the roof bow members must be removed, or at least one end of each roof bow must be removed from the corresponding recess so that the roof bow member can then be pivoted out of the way. The difficulty in removing the roof bow members from the recesses is further aggravated whenever the roof bow members become bent or misshapen in any way. It is often necessary to strike the underside of the roof bow member with a large hammer or the like in order to remove the end of the roof bow member from the associated recess. By striking the roof bow member with sufficient force to dislodge it, the problem of bending or otherwise damaging the roof bow members is accentuated.

It is therefore one object of the present invention to provide a roof bow system for a trailer unit in which one end of each individual roof bow is captured in a support member and is easily removed from the support member when desired.

Yet another object of the present invention is to provide a roof bow system for a trailer unit in which a locking device is provided to capture one end of each individual roof bow member in a corresponding support member, with all of the locking devices movable between a locked position and an unlocked position.

Yet another object of the present invention is to provide a roof bow system for a trailer unit in which all of the locking devices are moved simultaneously between the locked position and the unlocked position by a common actuation device.

According to the present invention, a roof bow system for a trailer unit for supporting a cover for the trailer unit is provided. The trailer unit has spaced-apart, generally parallel upstanding first and second walls. The roof bow system includes a plurality of bow members, each having a first end and a second end and each extendable between the first wall and the second wall of the trailer to support the cover. The system also includes means for mounting the first end of each of the roof bow members to the first wall of the trailer for pivotal movement. Means for loosely supporting the second end of each of the bow members on the second wall is provided such that each bow member extends between the first wall and the second wall to support the cover. Means for locking the second end of each of the bow members in the supporting means and means for actuating each locking means such that the second end of each bow member is locked and unlocked substantially simultaneously are provided.

One feature of the foregoing structure is that means for loosely supporting the second end of each of the bow members to the second wall is provided. One advantage of this feature is that the supporting means only loosely supports each of the bow members in a preliminary orientation which permits easy insertion and withdrawal of the bow member into the support means when desired.

Another feature of the foregoing structure is that means for locking the second end of each of the bow members securely in the supporting means is provided. One advantage of this feature is that, once the second end of the bow member is placed in the supporting means, the locking means can be actuated to secure the bow member in the supporting means.

Yet another feature of the foregoing structure is that means for actuating each of the locking means such that the second end of each bow member is locked and unlocked substantially simultaneously as provided. One advantage of this feature is that, upon actuation of the actuating means, all of the locking means are either locked or unlocked simultaneously to permit rapid assembly and disassembly of the roof bow system.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

FIG. 1 is a rear perspective view of a trailer unit incorporating the roof bow system according to the present invention;

FIG. 2 is a broken perspective view illustrating the locking and actuating assembly of the present invention;

FIG. 3 is a top plan view of the second side rail of the trailer unit showing a portion of the locking assembly; and FIG. 4 is a sectional view taken along lines 4—4 of FIG. 3.

DETAILED DESCRIPTION OF THE DRAWINGS

Referring now to the drawings, FIG. 1 illustrates a portion of a conventional trailer unit 10 that is part of a conventional truck tractor-trailer assembly. The trailer 10 includes a first side wall 12 and an opposite, second side wall 14 and is open on top. The first side wall 12 includes a first upper rail 16 and the second side wall 14 includes a second upper rail 18. A plurality of roof bow members 20 (two of which are shown in FIG. 1) are provided that extend between the first upper rail 16 and a second upper rail 18. The roof bow members 20 are provided to support a flexible cover 24 such as a tarpaulin or the like which is provided to cover the open top of the trailer 10. Although the entire trailer 10 is not shown, the trailer 10 is a conventional trailer unit which has a conventional length of approximately 45 feet. The roof bow members 20 are spaced-apart a conventional distance, approximately two feet in the illustrated embodiment. Thus, in such a forty-five foot trailer, there will be approximately twenty to twenty-five roof bow members 20.

Each roof bow member 20 has a first end 26 and an opposite, second end 28. The first end 26 of each bow member 20 is mounted in the first upper rail 16 for pivotal movement about a vertical axis. Although not shown in detail, the first end 26 of each bow member 20 fits into a recess formed in the first upper rail 16 to define the pivot axis. The recess (shown in dotted line in FIG. 1) into which the first end 26 is inserted is a conventional recess such as used on most conventional open trailers to receive the ends of roof bow members. Thus, the first upper rail 16 is unmodified in the trailer unit 10. The first end 26 fits into the recess in the first upper rail 16 such that pivotal movement of the roof bow 20 about the first end 26 is permitted.

A locking assembly 30 is provided for securing the second end 28 of each roof bow member 20 to the second upper rail 18. The locking assembly 30 is mounted on the second side wall 14 of the trailer 10. Specifically, the locking assembly 30 is mounted on the second upper rail 18, with a portion of the locking assembly 30 mounted on the vertical second side 14. The locking assembly 30 is provided to easily attach the second end 28 of each roof bow member 20 to the second upper rail 18. Specifically, the locking assembly 30 permits the second end 28 of each roof bow member 20 to be easily locked in the proper position on the second upper rail 18 so that the roof bow member 20 is properly positioned to support the cover 24. In addition, the locking assembly 30 permits the second end 28 to be easily unlocked such that the second end 28 of the roof bow member 20 is disengaged from the second upper rail 18. This permits the roof bow member 20 to be pivoted about the first end 26 toward the first side 12 to permit easy access into the interior of the trailer unit 10. Specifically, when unlocked, each roof bow member 20 can be pivoted to a storage position (not shown) where it is substantially flush and aligned with the first side 12 of the trailer 10.

FIG. 2 illustrates in greater detail the locking assembly 30 of the present invention. Specifically, the locking assembly 30 includes a support receptacle 36 that is attached to the inside surface of the second upper rail 18. It will be understood that one receptacle 36 is provided for each roof bow member 20. However, the following discussion will be directed to only that portion of the locking assembly 30 corresponding to one roof bow member 20. Each receptacle 36 is sized and configured to receive the second end 28 of the roof bow member 20 in a loosely held orientation.

The second end 28 of the roof bow member 20 is modified by the addition of a retaining ring 38 which is welded or otherwise attached to the downwardly turned second end 28. It will be understood that the addition of the retaining ring 38 is the only modification necessary to otherwise conventional roof bow members 20 so that they are adapted for use with the locking assembly 30 of the present invention. In all other aspects, the roof bow member 20 is a conventional unit.

A pivoting locking bar 42 is provided that is pivotally mounted on the second upper rail 18 and pivots on a pivot bolt 48. The locking bar 42 includes a locking portion 44 which extends over the receptacle 36 when in a locked position (FIG. 3), and an opposite drive end 46 that is attached to an elongated linkage bar 52 for a movement therewith. The linkage bar 52 is attached to each of the plurality of locking bars 42. Thus, simultaneous pivotal movement of each locking bar 42 is achieved by movement of the common linkage bar 52.

A rotating actuation rod 54 extends vertically downwardly through the second upper rail 18 and is connected to the linkage bar 52 by an arm 56. Brackets 58 are mounted on the inside of the second side wall 14 of the trailer 10 to permit rotational movement of the actuation rod 54. A handle 60 is affixed to the actuation rod 54 to provide the leverage necessary to rotate the actuation rod 54. A handle lock 62 is mounted on the inside of the second side wall 14 and serves to receive the end of the handle 60 to lock the actuation rod 54 after it has been rotated fully in the direction of arrow 64 toward the second side wall 14.

It will be understood from FIG. 2 that, when handle 60 is rotated in the direction of arrow 64, the linkage bar 52 will move in the direction of arrow 65. When linkage bar 52 is moved in the direction of arrow 65, the locking portion 44 of the locking bar 42 is pivoted toward the corresponding receptacle 36. This pivoting movement of the locking portion 44 of the locking bar 42 will act to capture the second end 28 of the bow member 20 within the receptacle 36 in such a manner that the second end 28 is rigidly secured within the receptacle 36. When in this position, the roof bow 20 is rigidly maintained in a proper position for supporting the cover 24. Likewise, rotation of the handle 60 in the direction opposite the arrow 64 will rotate the locking bar 42 to the unlocked position away from the receptacle 36.

FIG. 3 shows in greater detail the positioning of the locking bar 42 to secure the second end 28 of the bow member 20 in the receptacle 36. Each receptacle 36 includes an upstanding wall portion 66 with one portion 67 of the upstanding wall 66 facing the forward portion of the trailer 10, and a second portion 69 of the upstanding wall 66 facing the interior of the trailer 10. The receptacle 36 thus presents an opening which faces the rear portion of the trailer 10. This opening in the receptacle 36 permits the second end 28 of the bow member 20 to be pivoted into the receptacle 36 without any significant lifting of the bow member 20. Likewise, the second end 28 of the bow member 20 can be easily pivoted out of the receptacle 36 by pivoting the bow member toward the rear of the trailer 10. A short retaining wall 68 is attached to the rearward facing portion of the receptacle 36 and acts to provide a small obstacle to otherwise free pivotal movement of the second end 28 of the roof bow 20 into and out of the receptacle 36. It will be appreciated that, in the absence of the retaining wall 68, the second end 28 of the roof bow 20 may pivot out of the receptacle 36 before the locking bar 42 has been positioned to lock the second end 28 in place. By providing the short retaining wall 68, it is necessary to lift the second end slightly over the retaining wall 68 to insert it and remove it from the receptacle 36. The retaining wall 68 thus acts as a temporary restraint to prevent undesired premature rotation of a second end 28 out of the receptacle 36 during the locking or unlocking procedure.

The portion 69 of the upstanding wall 66 that faces the interior of the trailer 10 is angled away from the second upper rail 18 toward the rear of the trailer 10. This angle of the portion 69 is advantageous because such an angle acts to permit the second end 28 of the bow member 20 to be easily rotated into the receptacle 36, and to be guided to the rear portion of the receptacle 36. Thus, it will be understood that, if the portion 69 of the upstanding wall 66 were straight, movement of the second end 28 into the receptacle 36 could be significantly more difficult, especially if the roof bow 20 was slightly damaged or otherwise misshapen.

The locking portion 44 of the locking bar 42 is sized and configured to engage both the vertical portion of the second end 28 and the retaining ring 38. By engaging both the second end 28 and the retaining ring 38, movement of the second end 28 is prevented about all axis. Specifically, by engaging the retaining ring 38, the retaining ring 38 is captured between the locking portion 44 and the upper wall of the receptacle 36. Thus, vertical movement, either upwardly or downwardly, of the second end 28 is prevented. Likewise, by engaging the vertical portion of the second end 28, the locking portion 44 prevents movement of the second end 28 toward the rear portion of the trailer 10. In addition, movement of the second end 28 toward the front of the trailer is prevented by the wall 66 of the receptacle 36. Thus, with the locking portion 44 in position as shown in FIG. 3, the second end 28 of the roof bow 20 is securely held in the receptacle 36 such that any undesired movement of the roof bow 20 is prevented.

FIG. 4 shows in greater detail the mounting of the locking bar 42 on the second upper rail 18, and the function of the short retaining wall 68 in the receptacle 36. Specifically, FIG. 4 shows that, with the second end 28 positioned within the receptacle 36, a small portion of the extreme distal end of the second end 28 extends below the retaining wall 68. Thus, with the second end 28 positioned in a receptacle 36, and before the locking bar 42 has been rotated to a locked position, the second end 28 must be elevated slightly before it can be rotated toward the rear of the trailer 10 and out of the receptacle 36. Although the second end 28 needs to be lifted only a small amount, such lifting does ensure that undesired premature movement of the second end 28 out of the receptacle 36 is prevented.

To mount the locking bar 42 on the second upper rail 18, a spacer 76 is provided to ensure a proper spacing between the pivoting locking bar 42 and the rail 18. It will be understood that different sizes of spacer 76 may be utilized to adjust the distance between the rail 18 and the locking bar 42. This adjustment and spacing may be necessary to accommodate different trailer types, and specifically to accommodate different positions of a receptacle 36 on different types and styles of trailers.

In use, and assuming that all of the roof bows 20 are in a storage position (not shown) in which the roof bows 20 have been pivoted about their first ends 26 so that they are flush and generally aligned with the first side wall 12 of the trailer 10, free access to the interior of the trailer 10 is provided. To reposition the roof bows 20 so that the cover 24 may be installed, each roof bow 20 is pivoted manually so that the second end 28 is moved toward the receptacle 36 by the operator. The operator then must lift the second end 28 of each roof bow 20 over the retaining wall 68 and position the second end 28 in the receptacle 36. As discussed above, the retaining wall 68 acts to temporarily hold the second end 28 in this position. The operator continues to position each roof bow 20 in the corresponding receptacle 36 in like manner.

After all of the roof bows 20 are positioned with each second end 28 in a corresponding receptacle 36, the handle 60 is rotated in a direction of arrow 64 (FIG. 2) until the handle 60 is flush with the second side wall 14. This causes the linkage bar 52 to move in the direction of arrow 65 (FIG. 2) which pivots each locking bar 42 to an orientation shown in FIG. 3. Thus, in the orientation as shown in FIG. 3, the second end 28 of each bow member 20 is securely locked within each corresponding receptacle 36. The handle 60 is then placed in the handle lock 62 to lock the linkage bar 52 in the orientation shown in FIG. 3. With the roof bows 20 thus positioned, the cover 24 may then be placed in position and a trailer 10 is ready for transit or storage.

To unlock the roof bows 20 to gain access to a trailer 10, the reverse procedure to the above is followed. The handle 60 is removed from the handle lock 62 and rotated in the direction opposite the arrow 64. This moves the linkage bar 52 in the direction opposite the arrow 65 to position all of the locking bars 42 to the unlocked position away from the corresponding receptacles 36. The operator then lifts the second end 28 of each roof bow 20 out of each corresponding receptacle 36 and pivots each roof bow 20 to the storage position as discussed above.

Thus, the present invention provides a roof bow system in which the roof bows are easily moved to a storage position, and likewise are easily positioned to a use position where the cover may be installed. The common actuation system permits easy locking and unlocking of the roof bows with one motion of the actuation system. After the roof bows are unlocked, they are easily moved to an out of the way position. This permits easy change-over of the trailer from its use configuration with the cover installed to a configuration where access is permitted in the trailer body. In addition, damage to the roof bows is prevented because of the ease of locking and unlocking each roof bow.

Although the invention has been described in detail with reference to a preferred embodiment and specific examples, variations and modifications exist within the spirit and scope of the invention as described in the following claims.

What is claimed is:

1. A roof bow system for supporting a cover for a trailer unit, the trailer unit having spaced-apart, generally parallel, upstanding first and second walls, the system comprising:
   a plurality of bow members, each having a first end and a second end and each extendable between the first wall and the second wall to support the cover, means for mounting the first end of each of the bow members to the first wall for horizontal pivotal movement thereon, means for supporting the second end of each of the bow members to the second wall such that each bow member extends between the first wall and the second wall, said supporting means receiving said bow member upon said horizontal pivoting away from the first wall, means for locking the second end of each of the bow members in the supporting means, and means for activating each locking means such that the second end of each bow member is locked and unlocked substantially simultaneously.

2. The roof bow system of claim 1, wherein the supporting means comprises a receptacle that is sized and shaped to receive the second end of the bow member.

3. The roof bow system of claim 2, wherein the locking means comprises a locking bar which pivots between a locked position where the locking bar captures the second end of the bow member in the corresponding receptacle and an unlocked position where the locking bar permits movement of the second end of the bow member into and out of the corresponding receptacle.

4. The roof bow system of claim 3, wherein the actuating means comprises a slide rod attached to each of the pivoting locking bars and which is movable between a position where the locking bars are locked to a position where the locking bars are unlocked.

5. The roof bow system of claim 3, further comprising an engaging member attached to the second end of each bow member, the engaging member being captured by the corresponding locking bar when the locking bar is in the locked position to prevent movement of the second end of the bow member out of the receptacle.

6. The roof bow system of claim 5, wherein the second end of the bow member extends vertically downwardly and defines a vertical axis, and the engaging member and the corresponding locking bar cooperate to prevent movement of the second end of the bow member along its vertical axis when the locking bar is in the locked position.

7. A locking assembly for securing and locking one end of a roof bow which extends across a trailer unit, the roof bow horizontally pivotable about a vertical axis on one side wall of the trailer, the one end of the roof bow defining a generally vertical axis, the locking assembly comprising, a support receptacle on an opposite side wall of the trailer from the pivotal vertical axis for receiving the one end of the roof bow upon horizontal pivoting in an orientation where upward movement of the one end of the bow about the vertical axis is permitted;

a locking bar which pivots between an unlocked position away from the receptacle and a locked position where the locking bar captures a portion of the one end of the roof bow when in the receptacle to secure the one end of the bow in the receptacle and prevent upward movement of the one end of the bow about the vertical axis, and an actuator assembly for moving the locking bar between the unlocked position and the locked position.

8. A pivotal bow securing mechanism for use in a motor vehicle truck trailer to support a top therefore comprising: a compartment having at least two opposed vertical walls; at least two generally horizontally bows extending between said at least two opposed walls; each bow having a vertical leg at one end, which leg is vertically pivotally mounted on one of said at least two opposed walls to permit the bow to horizontally pivot about a vertical axis of the vertical leg; other ends of the bows being secured against vertical movement by latched means operable to secure and lock said other ends of said bows when the bows are horizontally pivoted such that said other ends come into contact with the other opposed wall.

9. A pivotal bow securing mechanism according to claim 8 where the other end of each bow has a member engaged by the latch means.

10. A pivoted bow securing mechanism according to claim 8 wherein the latch means includes a pivot member operating to slide a latching bar, which bar has engaging means to engage each of the other ends of the bows.

11. A pivoted bow securing mechanism according to claim 9 wherein the latch means includes a pivot member operating to slide a latching bar, which bar has engaging means to engage each of the other ends of the bows.

* * * * *